United States Patent

Bristow et al.

Patent Number: 5,218,198
Date of Patent: Jun. 8, 1993

[54] OPTICAL WAVEGUIDE SWITCH UTILIZING MEANS FOR DETECTING A TAPPED OFF FRACTION OF THE INPUT SIGNAL

[75] Inventors: Julian P. G. Bristow, Lakeville; Aloke Guha, Minneapolis, both of Minn.

[73] Assignee: Honeywell Inc., Minneapolis, Minn.

[21] Appl. No.: 895,484

[22] Filed: Jun. 8, 1992

[51] Int. Cl.$^5$ .............................................. H01J 5/16
[52] U.S. Cl. ........................... 250/227.24; 250/227.11; 385/41
[58] Field of Search ..................... 250/227.24, 227.11; 385/16, 14, 32, 40, 41, 48; 356/73.1

[56] References Cited

U.S. PATENT DOCUMENTS

| | | | |
|---|---|---|---|
| 4,422,088 | 12/1983 | Gfeller | 357/19 |
| 4,759,595 | 7/1988 | Boord | 350/96.13 |
| 4,768,854 | 9/1988 | Campbell et al. | 250/227.11 |
| 4,775,207 | 10/1988 | Silberberg | 385/8 |
| 5,148,507 | 9/1992 | Tanisawa | 385/41 |

OTHER PUBLICATIONS

"Integrated Optics in LiNbO$_3$: Recent Developments in Devices for Telecommunications", Lars Thylen, Jun. 1988 IEEE Journal of Lightwave Technology, vol. 6, No. 6, pp. 847-861.
Photonic Fast Packet Switching at 700 Mb/s, Ha, et al., OFC '91, Wednesday, Feb. 20, p. 78.

Primary Examiner—David C. Nelms
Assistant Examiner—T. Davenport
Attorney, Agent, or Firm—Michael B. Atlass

[57] ABSTRACT

An optical switch with a waveguide used as a detector is disclosed. The switch can be used for circuit or packet switching. The waveguide is used to tap off a fraction of the input signal going into the switch. The waveguide then sends the tapped off signal to a local electronic control to decide if switching is necessary or not. This is determined by within the local electronic control associated with the switch. The switch is set or reset based on information in the electrical representation of the signal which reaches the local electronic control. The switch can be used with continuous input signals as well as data packet input signals. By spacing the timing of data in the header differently than in the data in the "data" portion of a signal, extremely high bandwidth available in pure optical communications can be maintained.

21 Claims, 8 Drawing Sheets

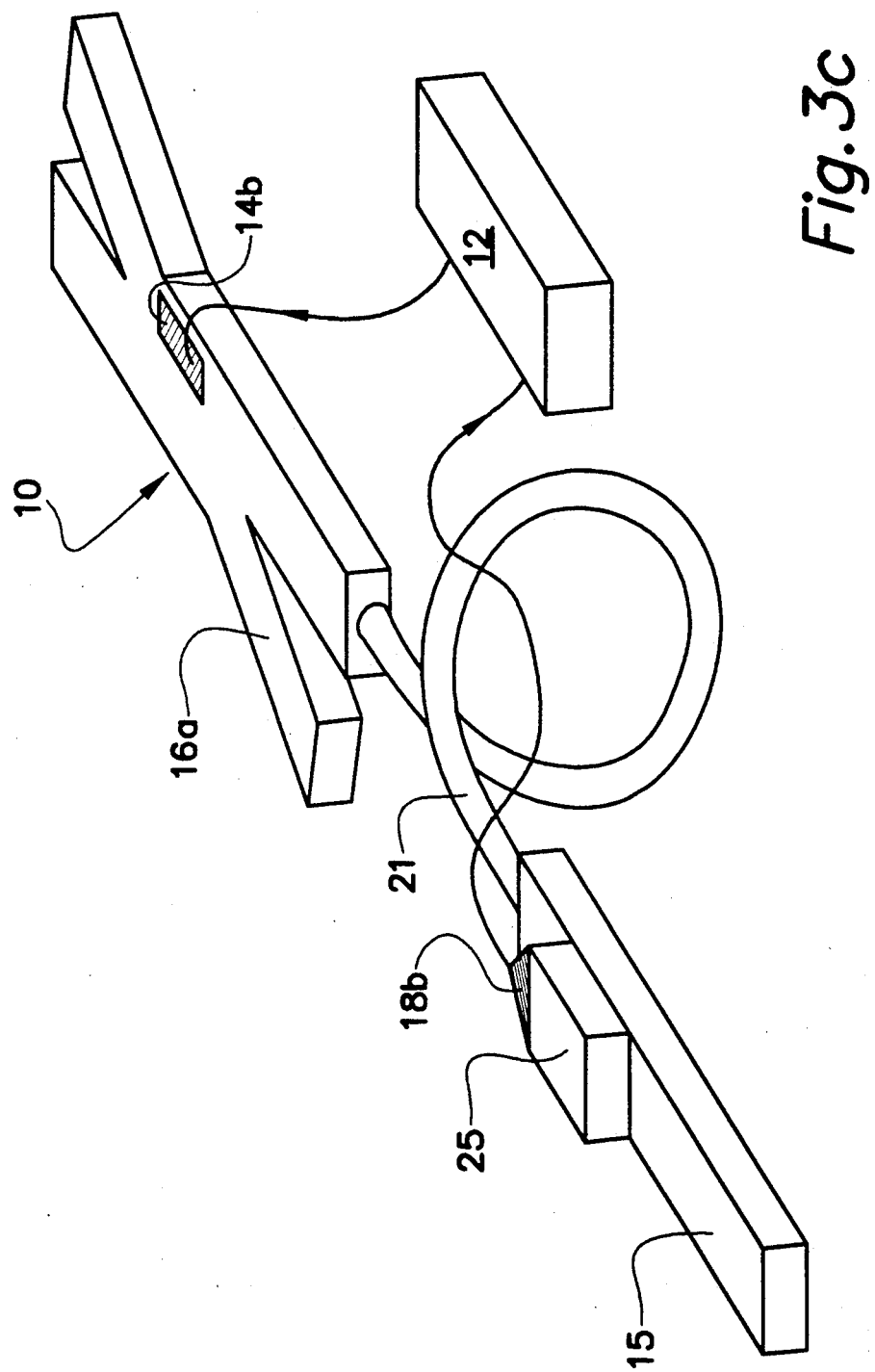

OPTICAL WAVEGUIDE SWITCH UTILIZING MEANS FOR DETECTING A TAPPED OFF FRACTION OF THE INPUT SIGNAL

BACKGROUND OF THE INVENTION

This invention relates to the art of optically controlled data switching. A typical switch will have at least one input port and at least one output port although a single input port could be switched between output ports. Generally, an optical signal is sent through the input port and routed to the appropriate output port by the switch.

Optical switches are commonly used in optical fiber communication systems. In such systems they route digital information across optical fiber networks. Another area is optoelectronic interconnects. In this area, optical switches can be used as repeaters and transceivers as well as for switching in optic communications links. For example, optical switches can be used to automatically switch out faulty devices in a communications network.

Present optical switches require the optical signal to be converted from optical to electrical form to determine if switching is required. The entire signal can then be changed back to optical and sent on to the determined path. In some of the present technology, an entire separate electronic control network is necessary to convert the signal from optical to electrical and back again. The process of switching the signal from optical to electrical and back again takes a great deal of time, limiting the usefulness of optical switches. The process limits the data rate within the network to the time that is required for the electronics to carryout the process. It would be beneficial for the data signal to remain in optical form. Using a tap off of the incoming optical signal, this invention reaches for this goal. Only information directing the data needs to be converted to electrical form and this provides for routing without converting the data portion of the signal.

Previously, the ability to tap off a part of an optical signal has been used with waveguides in fiber optic lines to send a signal to many different receiving nodes by splitting the signal. The waveguide would tap off or split off a fraction of an amount of a signal and send the tapped off or split off signal to a receiving node. The fraction to be tapped off or split off would be determined by the number of nodes in the system. If there are only a few nodes, the signal would be considered "split". For example, if one desired to have the signal divided so that an equal division of the signal goes to each node and if there are five nodes, then twenty percent of the signal would be split off, so twenty percent of the signal could be sent to each of the five nodes. Where there are more than twenty nodes, the signal may be tapped off at five percent or smaller levels so that each node receiving such a signal would get only a small part thereof through the tap-off.

This tapping off ability is used in this invention to tap off a fraction of an input signal and use the tapped off signal to determine the switch setting while the remainder of the input signal remains in optical form. The tap off ability would be beneficial in switches in that data transfer or switching would be allowed without slowing to convert the data portion of the optical signal. Current optical switches do not use a tap off ability for such a function.

The preferred method to tap off signals is with the use of waveguides. An example of a known optical waveguide switch may be seen in U.S. Pat. No. 4,759,595.

The invention would be particularly useful in an optical crossbar of switches interconnecting a number of processors. The invention can be used to help eliminate the need for a global controller that is required for global communication in a crossbar. The crossbar can also process the switching in parallel to increase the bandwidth for information communications.

SUMMARY OF INVENTION

This patent teaches an optical switch that changes the direction of data without changing the data signal from optical to electrical and back again. The invention can work as a circuit switch or a packet switch depending on if the signal is continuous or in a packet form. The optical message signal sent into the switch has an address header, indicating where the data signal that will follow later is to go. The address header precedes the data so that the address of where the data is to proceed will be known in time to send the data there. There are alternate ways to delay the data portion of the message signal.

The switch preferably has two inputs and two outputs. The inputs and the outputs meet in the middle of the switch (substantially in the form of a "x"). The input signals either pass straight through (staying to one side of the switch) or cross (interchange). One preferred default setting of the switch sends the optical signals straight through the switch rather than crossing the signals. Whether the switch stays in default or is set otherwise is determined by the information in optical signal header being tapped off by the waveguide.

The waveguide is used in this invention as part of a switching determination apparatus. In the preferred embodiment, the waveguide taps off the optical signal by absorption, but absorbs very little so that the optical signal will not be affected very much. It is preferred that the tapped off portion signal is only approximately 1 to 2% of the input signal. This tapped off signal is then sent to an electronic control which determines whether the switch should reset (change its setting) or remain in its default mode.

The local electronic control can be functionally and physically separate from the waveguide switch if desired, or packaged contiguously or on the same substrate as the switch. This electronic control will determine if switching is required but will require some minimum strength of the tapped off signal. The tapped off signal is converted into an electrical representation of the signal and is then checked electronically to determine if switching is necessary. The electrical representation can be any electrical representation of the signal such as a digital or bit signal or a voltage signal. Ways to use either are well understood by those of ordinary skill in the electronics data art. A control signal, based on the determination made in the electronic control, is sent back to set the mode of the switch.

This switch can be used for many different uses including serial or parallel processing in communication systems. In parallel processing, many bits of data could be sent through many switches in parallel. A group of parallel switches makes up a node in a parallel crossbar. An example of this would be a 4×4 crossbar in which there would be 4 inputs and 4 outputs if it is a serial circuit and 16 inputs and 16 outputs if it is a 4 bit wide parallel circuit. The switches are connected in parallel so that the data entering into the crossbar can switch in parallel. Where such an implementation is expected, the switching node may only need one tap off for one header or, alternatively, the tap off could be done in parallel and the destination signal decoded in parallel. With the default function of the switches, the data would go straight through the rows of a crossbar. A switching effect would be demonstrated by the data going down the columns in a crossbar when it is decided that switching is necessary.

BRIEF DESCRIPTION OF THE DRAWINGS

The present invention is described in detail with reference to the following figures.

FIG. 3b is a three-dimensional side view of an implementation of the fiber optic delay line and the packet switch shown in FIG. 3a.

FIG. 3c is a three-dimensional side view of another alternative implementation of the fiber optic delay line and the packet switch shown in FIG. 3a.

FIG. 3d is a three-dimensional side view of another alternative implementation of the fiber optic delay line and the packet switch shown in FIG. 3a.

DESCRIPTION OF THE PREFERRED EMBODIMENT

Figure 1:
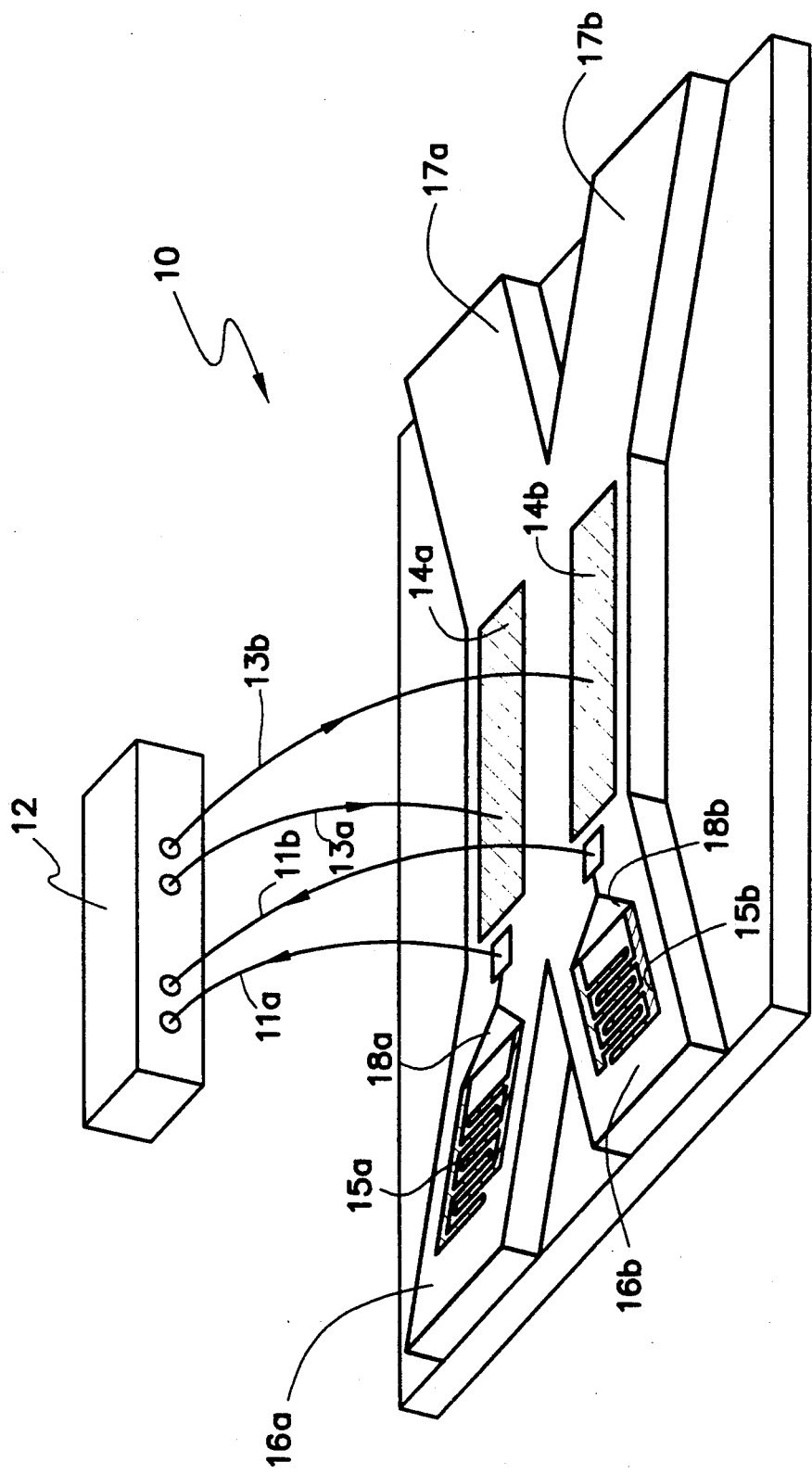
FIG. 1 is a three-dimensional side view of an optical switch with waveguides as the detector and a local electronic control.

In FIG. 1, an optical switch 10 is shown with two input ports 16a and 16b and two output ports 17l and 17b. This switch 10 of FIG. 1 will preferably be used as a circuit switch as opposed to a packet switch which will be described with reference to FIG. 3. The input and output ports 16 and 17 cross in the middle forming an "x" shape. In the preferred embodiment, the input signals are sent straight through the switch in default mode. Thus, the input from the top input port 16a goes to the top output port 17a and the input from the bottom input port 16b goes to the bottom output port 17b in default mode. When switching is required, crossover occurs. This means that the signal from the top input port 16a goes to the bottom output port 17b and the signal from the bottom input port 16b goes to the top output port 17a. It is possible to set the default to crossover if desired.

The input signals entering this have an address header, along with any information that may be required for the desired implementation. The address header contains information which communicates where the associated data portion (that will go into the switch after the switch has been set) is to proceed.

As the two input signals enter the separate input ports 17, a waveguide detector 15a and 15b, integrated onto the switch, is used to tap off a small fraction of the input signal. The waveguide used may preferably be GaAs or AlGaAs, both of which constructions can be made from already available present technology. Other waveguide compositions may include InP GaInP and GaInAsP. Some polymers may also be used to construct waveguides as is now known in this art. Travelling wave electronics may also be used and would be preferred where the device will be used in packet switching. Resonant wave, travelling wave, and phase reversed techniques may also be used to increase the speed of response. The waveguide 15 achieves this tapping off process by absorbing preferably 1 to 2% of the input signal and directs this energy to the local control for the switch.

After the signal is tapped off, in the preferred embodiments, detectors on the waveguides 15 change the signal from optical to electrical so that the tapped off signal can be processed in a local electronic control device 12. The detectors will be described in more detail with reference to FIG. 2. They may be "liftoff" or hybridization integrated circuits together with the optical switch structures on the same substrate.

Before the tapped off signal is sent to a local electronic control device 12 to determine if switching is required, it will be necessary for the tapped off signal (once converted to an electrical signal) to be amplified for effective processing the local electronic control 12. This amplification process will preferably be accomplished by either a transimpedance or a hi-impedance amplifier 18. The amplifier 18 is placed right after the waveguide 15 and before the tapped off signal leaves the switch 10 and is sent to the local electronic control 12.

After amplification, the tapped off signal is sent to a local electronic control device 12. The local electronic control 12 may be physically separate from the waveguide switch and the tapped off signal is sent there via electrical lines 13. Alternatively, and preferably, the lines 13a and 13b and the control 12 may be located on the same chip as the switch 10. A form of local electronic control 12 is well known in the present technology and may be obtained from Gigabit Logic or Tri-Quint, Inc, both California companies.

Preferably, at the current time, a GaAs or high speed silicon electronic control device would be used, but the implementation can be improved by using higher speed devices as they become available.

An evaluation of the address information in the header is made within the local electronic control 12 to determine if switching is required.

Numerous schemes and devices could be used to decode the address information to make the switching determination. For example, where the invention is used for a single switch control or only a very few such switches are involved, the address portion may only be a continuous rise in voltage occurring for an approximate length of time (or in optical, a continuous "present" signal in a given time frame or at a given time). Where this matches a predetermined value, the switch may be switched based on this. In more complex systems, a number of pulses or absence of pulses in a code may indicate an address which is compared to the switch address itself (some representation of which must be stored in or accessible to the local electronic control for that particular switch). This allows for self routing such as is described with reference to copending U.S. application Ser. Nos. 07/740,260, "Design and Implementation of Self-Routing Interconnection Networks", 07/740,263, "Scalable Self-Routing Non-Blocking Message Switching and Routing Network", and 07/740,261, "Crossbar with Return Net for Scalable Self-Routing Non-Blocking Message Switching and Routing System".

If the values so indicate, the local electronic control 12 will send a determination signal to change the switch setting or leave it in its default position. This determination signal or control is sent back to the switch via electrical lines 13.

Figure 5:
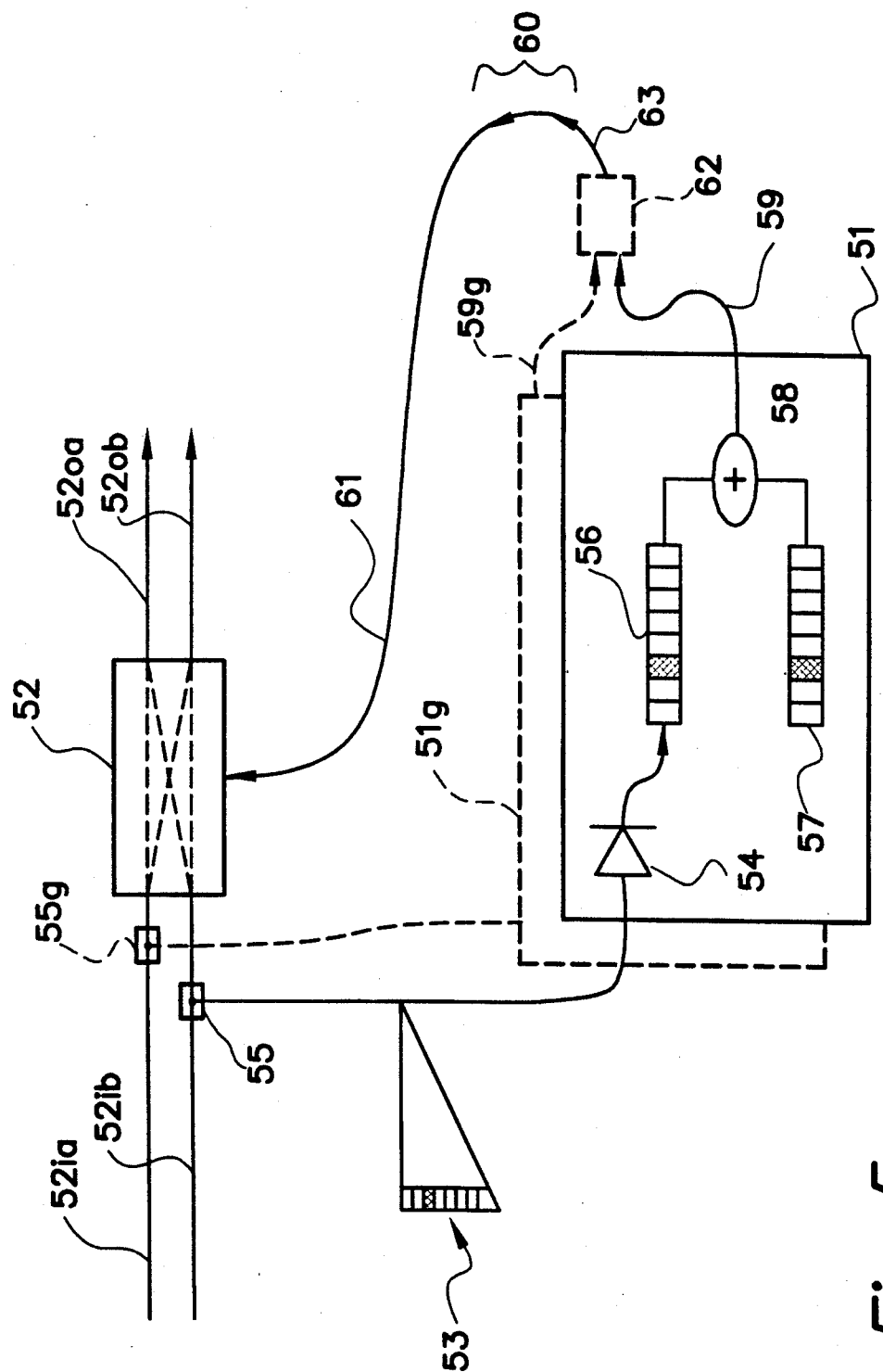
FIG. 5 is a block diagram of a local electronic control embodiment.

To be complete, a description of the function of a comparison based electronic control is described with reference to FIG. 5. In FIG. 5 an optical switch 52 has inputs 52ia and 52ib which can either pass through to outputs 52oa and 52ob respectively, or cross so that 52ia connects through switch 52 to 52ob, and 52ib to 52oa.

Figure 6:
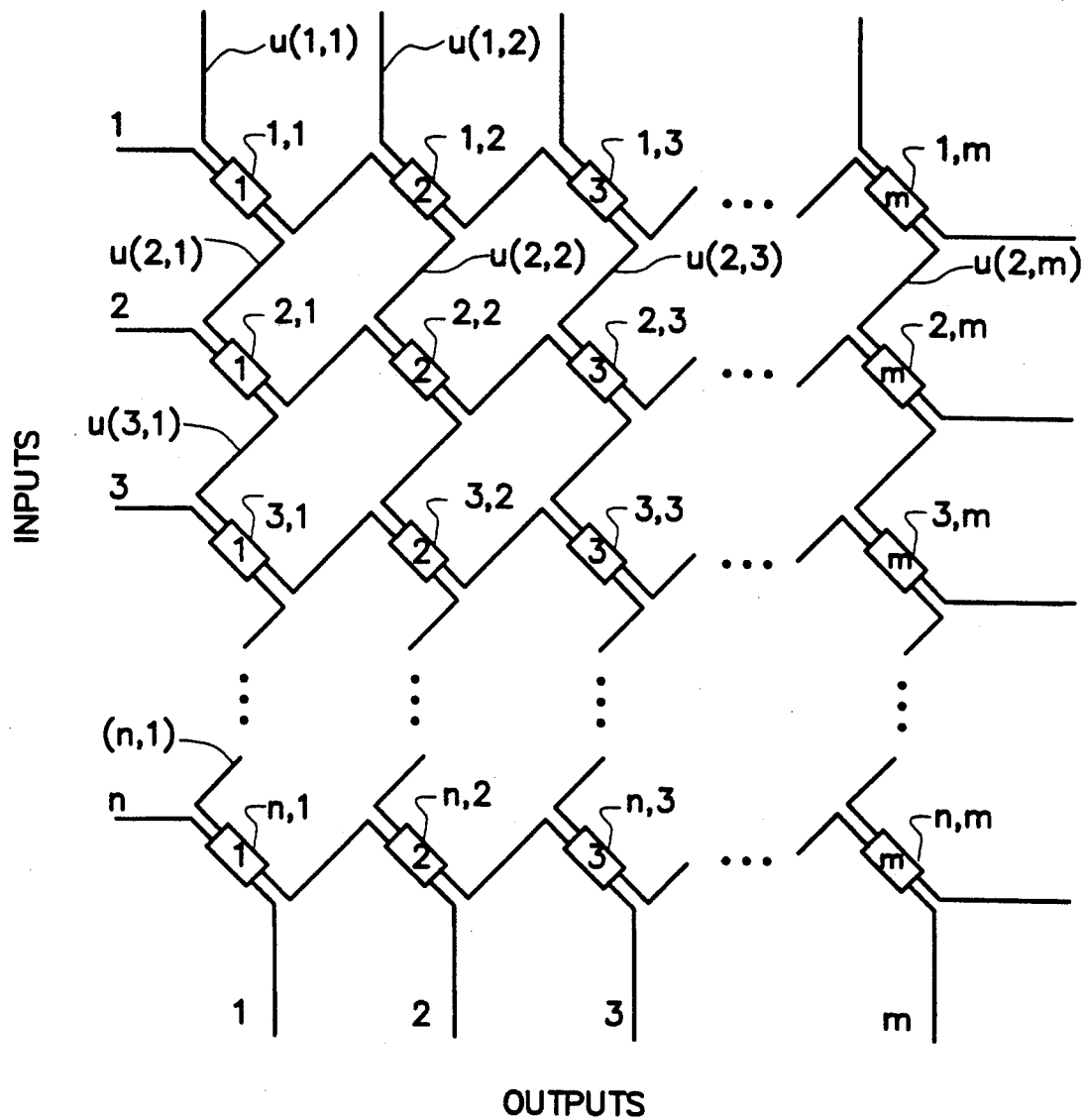
FIG. 6 is a block diagram of a crossbar including n by m switches for connecting each of n inputs to each of m outputs.

The preferred embodiment would have the ia and ib inputs default to the ob, oa outputs, respectively (a cross default), and the ia and ib inputs output to the oa and ob outputs, respectively, only on switching. This makes it better suited for in a crossbar like 70 of FIG. 6.

In one configuration, no delay may be required for the upper inputs (FIG. 5, u$_{(i,j)}$) since data on these will continue downward without requiring a turn throughout this crossbar 70. (In any embodiment, if desired, switches may include a broadcast mode where the input, or either input, is broadcast to both outputs. See one of the three copending applications mentioned above for configuration of multiple switches in broadcast systems. It would be preferred that one input be used to broadcast.)

A detector, waveguide detector 55, takes a small portion 53 of the signal from one of the inputs and sends it to the electronic control 51. It is amplified on input at diode or amplifier 54 and serially input into register 56. Register 56 is an 8 bit register for this heuristic example. So is register 57. The two registers are clocked out together to logical compare device 58 which, on a match, sends a signal on line 59 (amplified by amplifier 60 and continuing through line 61) back to the control electrodes in switch 52.

Also shown on FIG. 5 is an embodiment of a special case first-in-time switch setting selector comprising elements in dotted lines 55g, 51g, 59g and 62. In the preferred embodiment with switch 52 set into a crossbar like that of FIG. 6, input 52ia would be positioned as an upper input u$_{(i,j)}$. Therefore, the signal needs only to go through in default mode setting when it goes through, and no setting of the switch out from its default is required. Therefore, no address comparison would be required for this type of configuration. Having said that this first-in-time apparatus may be quite simple, requiring only a detector 55g connected to send signals to another detector 51g, whose output is 59g either a logical 1 or 0.

A timing flip-flop like device 62 will hold either the 0 or 1 received, at its output 63 for a preset period of time. From here the signal continues through amplifier 60 and line 61 to reach the switch setting electrodes in switch 52. The time window during which device 62 may respond to new inputs is governed by the timing logic or the recognition of the address header. Instead of using timing logic one could use an end-of-message marker to control the availability of unit 62.

As will be readily recognized to those of ordinary skill in the art, there are numerous variations on the ways first-in-time control can be accomplished. The above description with reference to FIG. 5 should be taken as illustrative only of the concept and how it may be accomplished.

Electrodes 14 exist on the switch and will detect the control signal and switching will or will not occur depending on the control signal. This form of optical switching control is well known.

Figure 2:
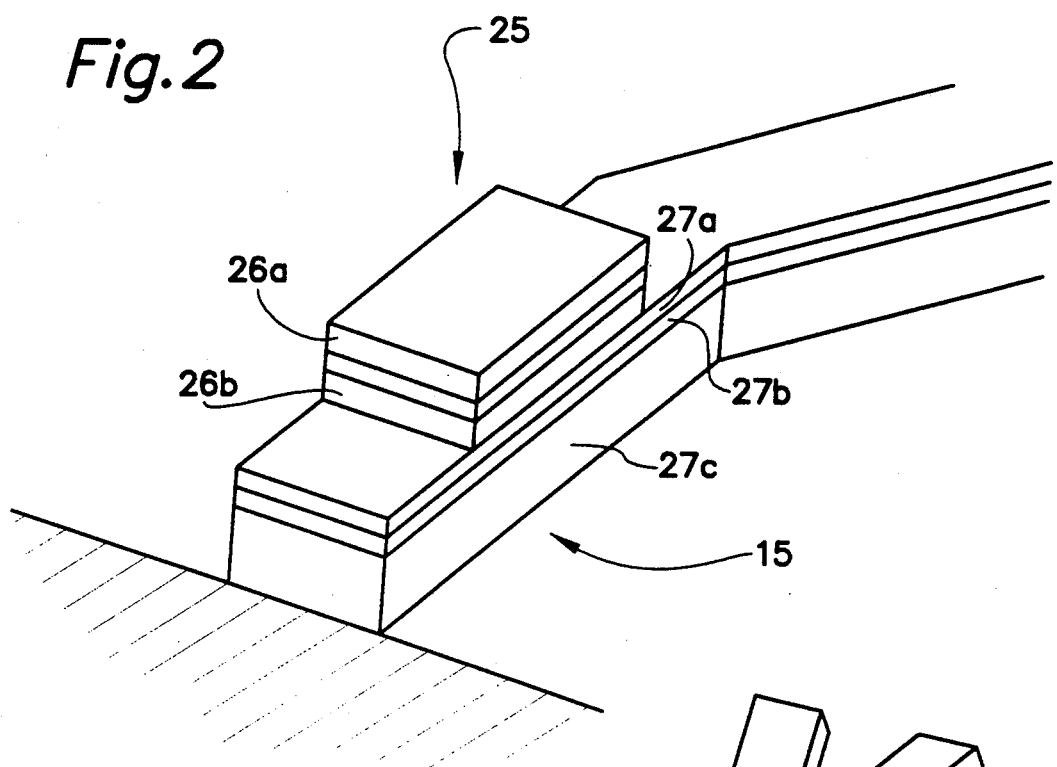
FIG. 2 is a three-dimensional side view of a detector existing on a waveguide.

FIG. 2 discloses a detector 25 that exists on each of the waveguides 15 to change the signal from electrical to optical so that it can be processed in the local electronic control 12 described in FIG. 1. Presently available detectors for this application are of two types, either a PIN (P-type Intrinsic N-type) detector or a MSM, Metal Semiconductor Metal. Both of these detectors are well known in the present technology. As others become available to do the same job, they can be substituted.

FIG. 2 shows the preferred embodiment detector 25 which is a PIN detector. The P-type layer 26 and the N-type layer 26b are doped GaAs layers grown on the low-loss waveguide 15. In locations that the layers 26 are not required, they are easily etched away. The waveguide itself consists of an upper cladding 27a, a guide layer 27b, and a lower cladding 27c. It is the thickness of the upper cladding 27a that determines the fraction of the signal that is tapped off. As previously mentioned, the detectors and the waveguide are well known in the art as separate entities. It should also be recognized that there are some timing considerations in the transfer from optical to electrical medium for carrying the information. Since the optical medium is much faster, many more bits of data may pass through in a stream of data in a given unit of time than in a corresponding electrical medium. It is therefore important to time the spacing of the information in the header portion of the optical signal to allow sufficient time after conversion to electrical pulses, so as to not blur the data bits. For example, if it takes one ns to process an electrical "bit", the header information in the optical signal must be spaced bit-wise—at greater than one ns intervals, otherwise, the decoder in the logic control will not be able to read, or may misread, the data. This problem illustrates the savings in time accomplished by relying only on the converted header portions to control the switch. The remaining data portion of the optimal may pass through the switch with less than 1 ns spacing.

Figure 3D:
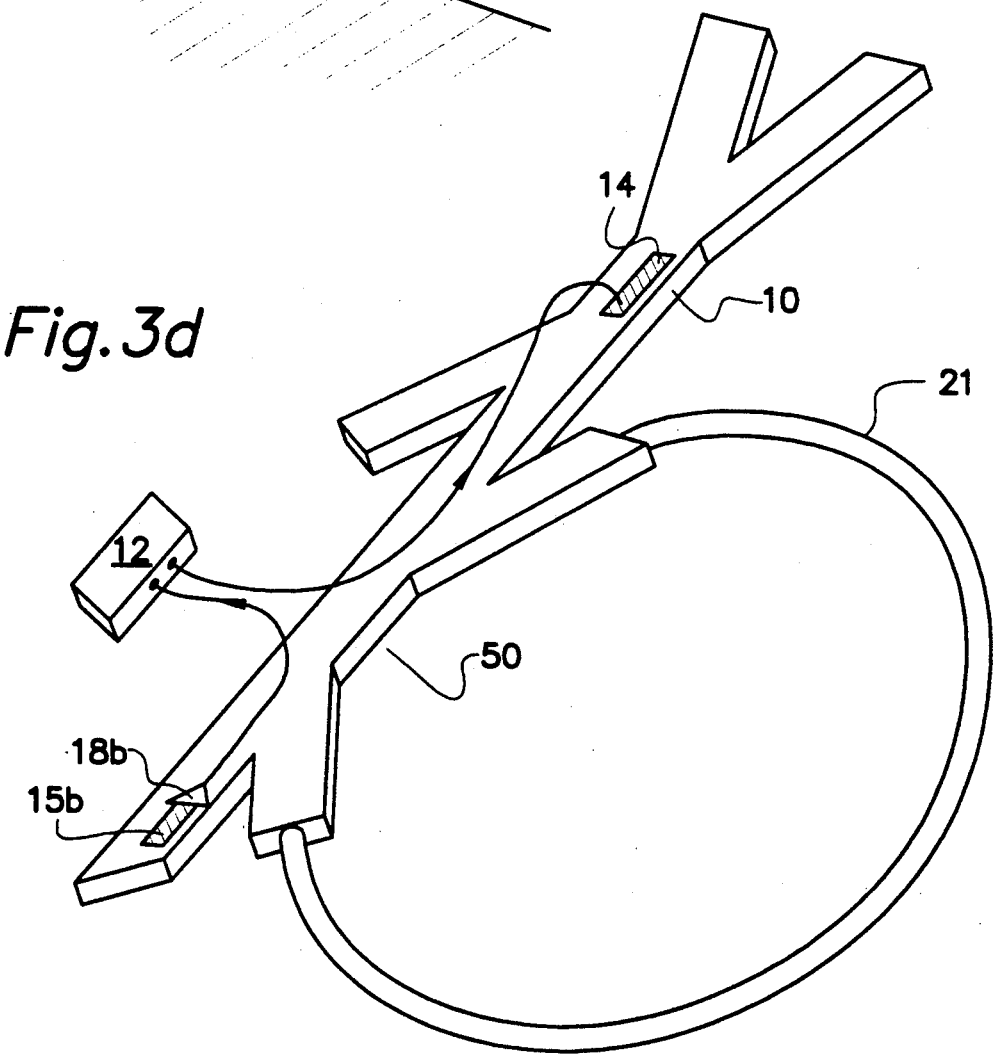
Figure 3A:
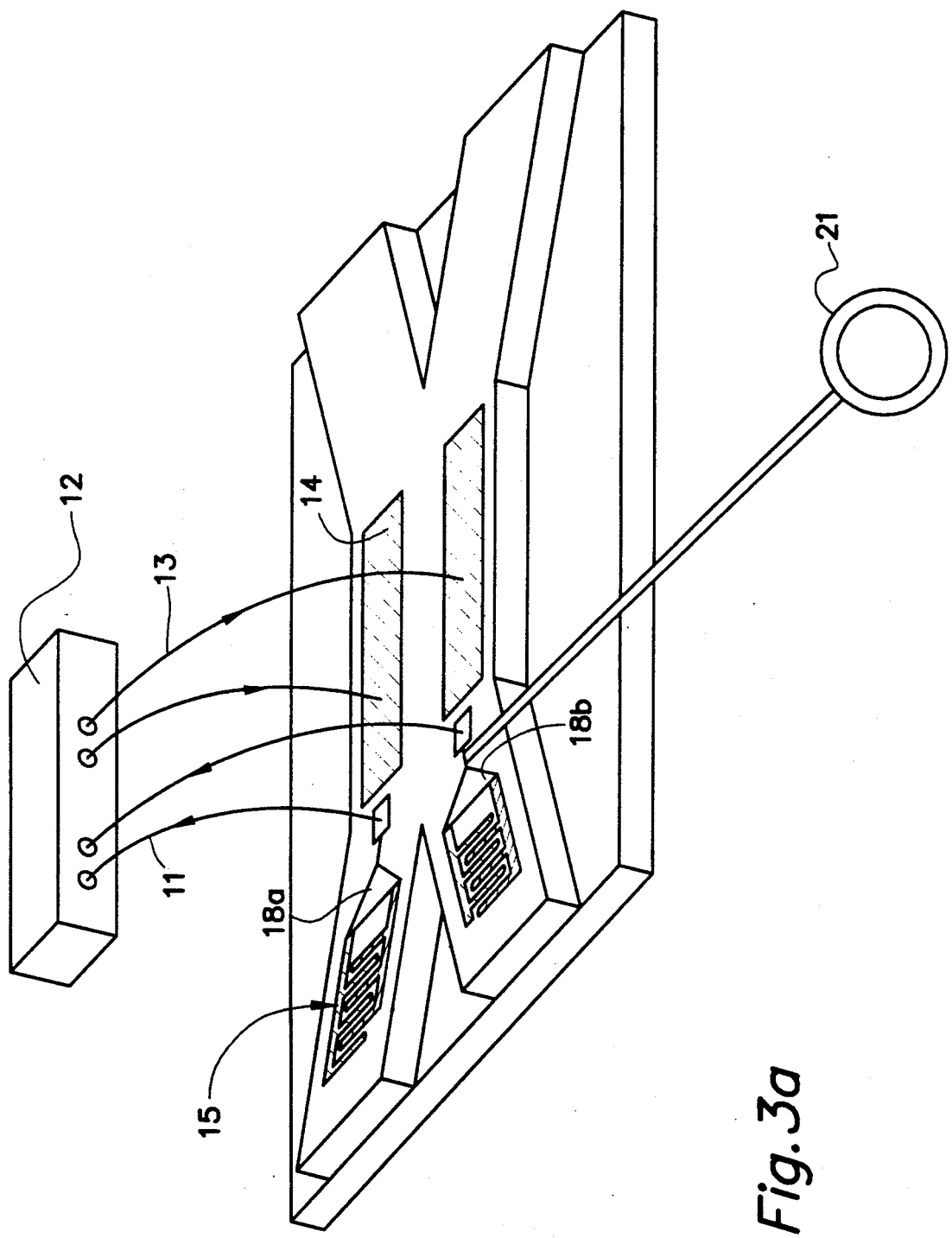
FIG. 3a is a conceptual three-dimensional side view of an optical switch for packet switching with waveguide detectors, local electronic control, and fiber optic delay line.

FIG. 3a illustrates the base switch of FIG. 1 but has added features to enhance its use for packet switching. In this figure, a heuristic form of a fiber optic delay line 21 is included to delay the input signal after it has been tapped off. The delay line will exist at a point between the where the signal enters the switch and where the signal is tapped off. This delay line 21 will delay the input signal for approximately 40 ns while the tapped off portion of the input signal is sent to the local electronic control 12 to be processed in one preferred form. A 40 nanosecond delay or latency is assumed for a fair sized mesh or crossbar (16×16 switches). The latency per node is about 1 to 2 nanoseconds. The length of the delay should be adjusted depending on the size of the implemented crossbar or mesh configuration.

In this packet switching system, a very small fraction of the light signal in the packet is tapped off, preferably approximately 1 to 2%. As mentioned previously in the FIG. 1 description, the local electronic control 12 will determine the switch setting based on information in the header portion. It will be necessary for the tapped off signal, when converted to electrical form, to be amplified for an effective determination within the local electronic control 12. The amplification process is the same as the process described in FIG. 1. Also, the determination within the local electronic control 12 will be performed as in the description of FIG. 1.

Once the comparison within the local electronic control 12 has determined what to do with the switch setting, the input signal will be sent to the switch 10 at the same time the determination signal is sent through the switch. This will allow the switch to be set by the time the input signal reaches the switch.

Figure 3B:
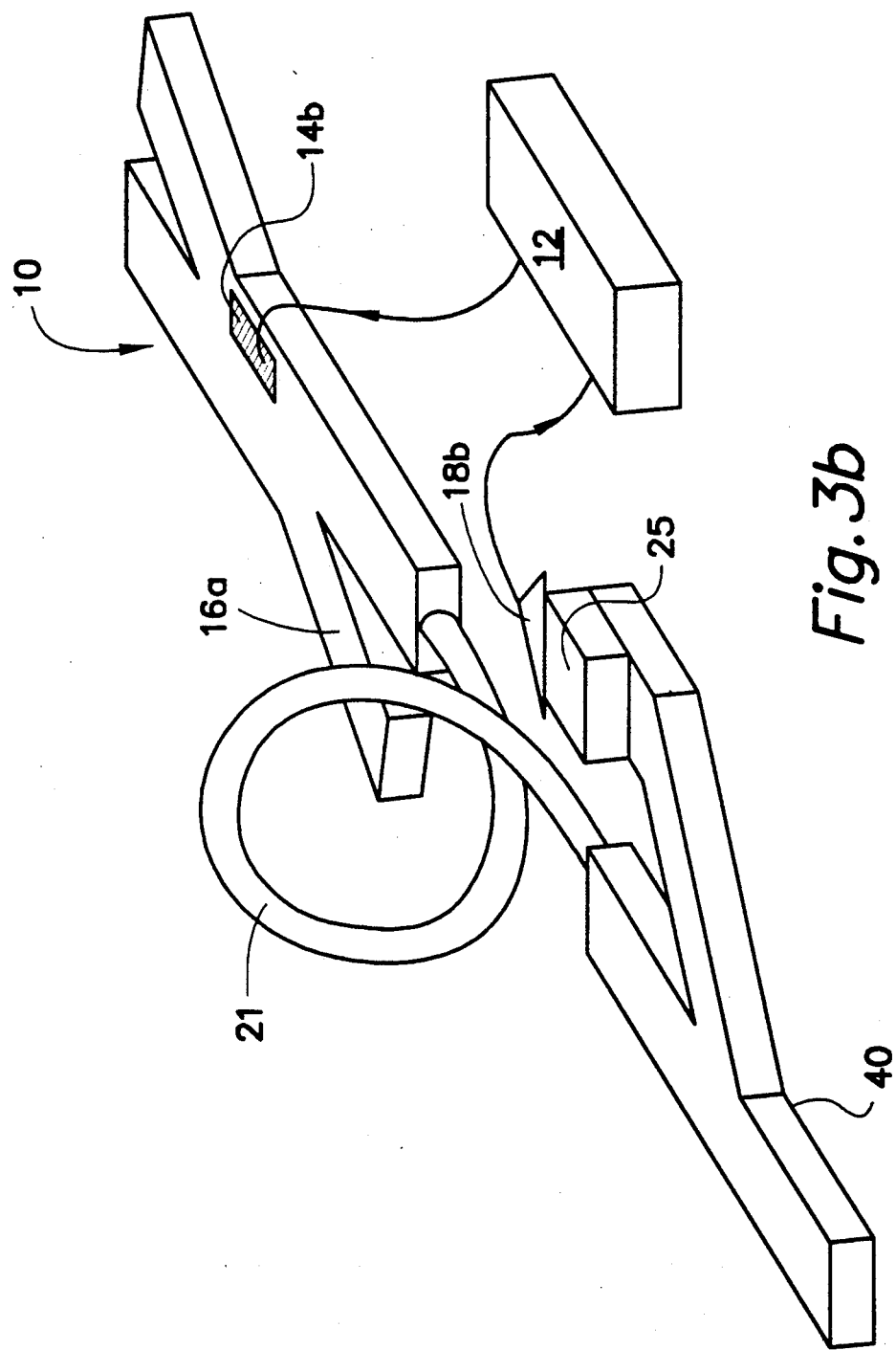

FIG. 3b shows an alternative delay system for the packet switch described in FIG. 3a. In this system, a fiber optic delay line 21 is located in the optical path before the switch 10. A Y-junction 40 should be located before the delay line 21 to tap off a small percentage of the signal. This tapped off signal would go through one branch of the Y-junction 40 while the rest of the packet signal is sent through the other branch of the Y-junction 40 and to the delay line 21. The tapped off portion information is converted to an electrical representation by a detector 25 located on the Y-junction 40 and sent to the local electronic control 12. This delay line and tap off Y-junction system would also exist for the other input of the switch 16a (for convenience, only one is shown in the drawing). However, only one electronic control 12 is necessary, although it could receive input from both input tap-offs. In this latter case, either a hierarchy of precedent or an acceptance of race conditions to control the switch for a preset time interval should be established in the local electronic control (this race or priority control could be used with any multiple input configuration).

FIG. 3c illustrates an alternative delay system. In this system, the fiber optic delay line 21 is before the switch 10 in the optical pathway. Before the delay line 21, a waveguide 15, with a detector 25 and an amplifier 18b on the waveguide 15 tap off a small percentage of the packet signal and convert it to electrical signal and amplify that. This tapped off portion is converted and amplified by the detector 25 and the amplifier 18b respectively and then sent to the local electronic control 12. This alternative delay system would also exist for the other input of the switch 16a. However, only one electronic control 12 is necessary. From this point on, the process would be the same as that described in FIG. 3a.

FIG. 3d presents an alternative delay system for the packet switch in FIG. 3a. In this delay system, a passive crossbar switch 50 would exist right before the switch 10 described in this invention. The passive switch 50 will have a waveguide detector configuration as that described in FIG. 2 along with an amplifier 18b. The waveguide detector will function as described in FIG. 1. The passive switch 50 has a default setting which will set the switch and sends the packet signal through the delay line 21. After the comparison has been completed as described in FIG. 1, the packet signal will cross over by default and enter the input 16b of the waveguide switch 10. The switch 10 will already have been set and the signal will either cross over or pass through. This delay structure would also exist for the other input of the switch 16a. Again, only one electronic control 12 is necessary. It should be noted that the tap-off could occur on the active switch as well, or even on the delay line if preferred.

Figure 4:
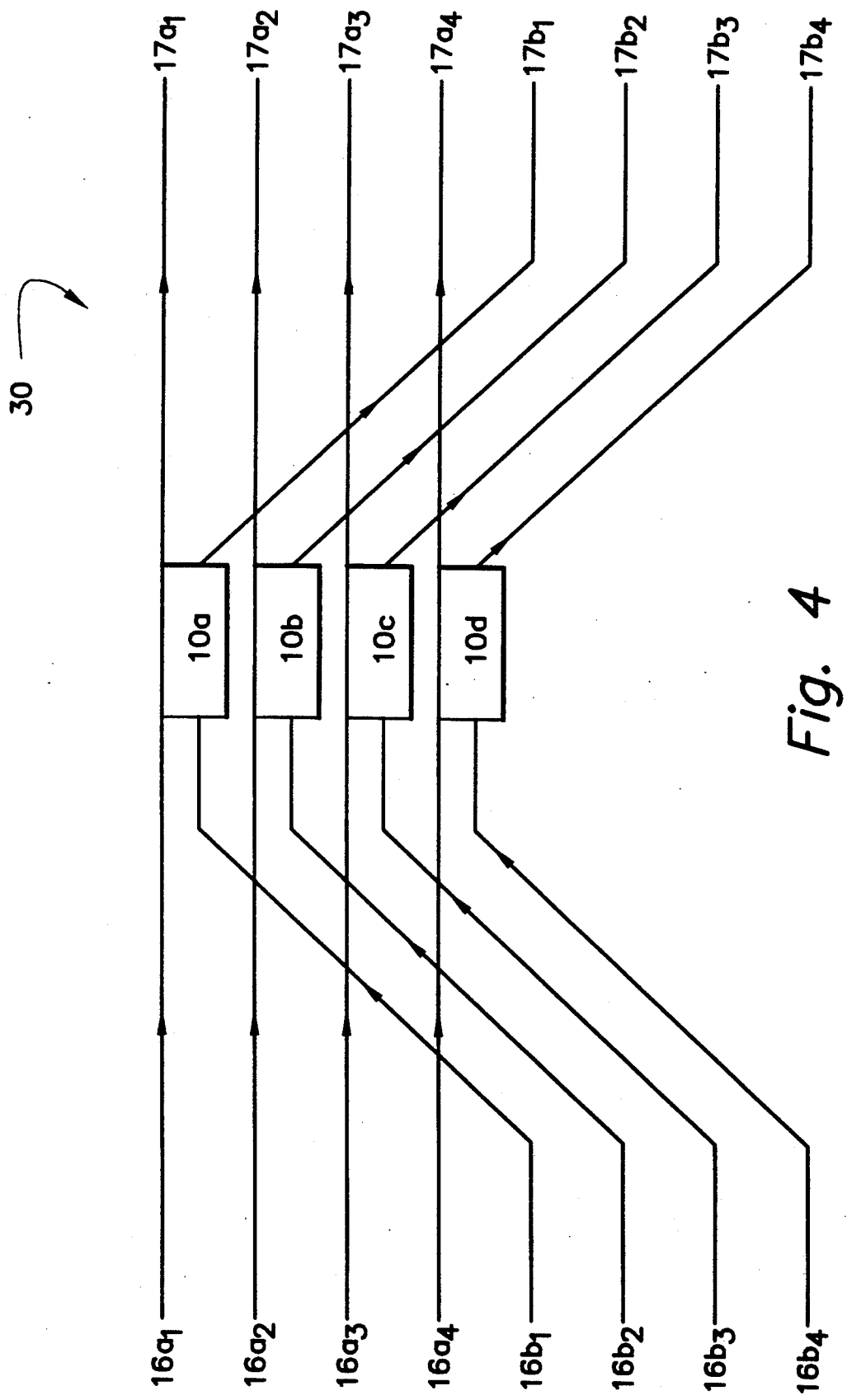
FIG. 4 illustrates parallel processing with the use of optical switches.

FIG. 4 depicts a parallel 2×2 switch which involves perfect shuffle mapping. The mapping is constituted of several switches 10a-d. These are substantially the same switches described in FIG. 1 or 2. In FIG. 3, each switch 10a-d has two inputs 16a and 16b. Lines 16a and 16b provide input to switch 10a, whose output is 17a and 17b; lines 16a2 and 16b2 provide input to switch 10b, whose output is 17a2 and 17b2; and so on. Such a switch could be substantially larger if desired and still be in the same form having inputs 16an and 16bn switched to outputs 17an and 17bn.

Each switch ID will ordinarily be sent two bit streams of optical data. If it is determined that switching is not required, then the bitstream 16 will pass straight through. However, if it is determined that switching is necessary, the default setting for the switch will not be used and the output will be switched for all switches at once. If switching occurs, all the switching between the switches 10a-d would occur in parallel. Each one of these switch systems 30 in FIG. 3 is referred to as a parallel or serial node and a network of nodes can be used to build a crossbar.

It should be noted that only one of the switches in the perfect shuffle need receive control information, and only it needs to have the tap-off which sends that information to the detector, a single detector for the group. This single detector can set the whole group with identical control signals sent at substantially the same time. The single switch may be considered inactive if it does not receive data input.

In fact, whole crossbars and arrays of parallel switches of other sorts could be controlled together if desired, on the basis of a unitary header.

This patent should not be considered limited except as set forth in the following claims:

What is claimed is:

1. An optical switch having an optical input signal,
an optical waveguide located on the switch for tapping off a small portion of said optical input signal,
and a detector for detecting said tapped off portion and for generating electrical signals representative of information in said tapped off portion, wherein said electrical signals are subsequently decoded to determine the setting of the switch.

2. The detector of claim 1, wherein the waveguide taps off approximately 1% to 2% of the optical signal reaching that portion of the switch at which said detector is located.

3. An optical switching device as set forth in claim 1 wherein said electrical signal is routed to a local electronic control device which determines whether or not to change the switch setting.

4. The switch as set forth in claim 1, wherein said optical input signal goes straight through the switch by default and only switches the output if the local electronic control determines that switching is necessary based on information in the input signal.

5. A packet switching device having a switch,
a detector to tap off a small amount of an optical input signal sent to said switch for use in determining the setting of the switch, and
a delay device in the optical path between said detector and said switch to create a predetermined time delay between the time an optical input signal reaches the detector and the time the optical input signal reaches the switch, in order to allow a determination process which uses said small amount of signal during said predetermined time delay to decide if switching is required and to switch the switch.

6. The switch as recited in claim 5, wherein the optical signal goes straight through the switch by default and only switches the signal if the local electronic control determines that switching is necessary.

7. An input signal for the device set forth in claim 5, wherein the input signal is comprised of a data portion and an address header portion, which indicates intended signal destination.

8. The delay means as recited in claim 5, wherein said delay means comprises a fiber optic delay line.

9. The time delay as recited in claim 5, wherein the input signal is delayed less than five nanoseconds.

10. The determination process as set forth in claim 5, characterized in that the determination of the switch setting is accomplished by converting said small portion of the input signal to electrical form and sending it thus through an amplifier and then to a local electronic control means which determines the switch setting and, when required by information in said electrical form, sends a determination signal from the local electronic control back to the switch to set the switch if necessary, in which this process is completed while the input signal is delayed so that the input signal is sent to the switch after the determination signal has had time to set the switch.

11. A switching device having a predetermined number of switches as set forth in claim 1 in which each switch conducts an independent datastream but in which all switches are set simultaneously if it is required.

12. A switching device comprising a set of switches as set forth in claim 1 wherein a single control signal sets all of said set of switches the same way simultaneously.

13. An optical switch for receiving and switching, where required, an optical input signal, an optical waveguide located in or connected to the optical pathway leading to said switch for tapping off a small portion of said optical input signal, and a detector for detecting said tapped off portion and for generating electrical signals representative of information in said tapped off portion, wherein said electrical signals are subsequently decoded to determine the setting of the switch and sending control signals thereto, and control means incorporated into said switch for receiving said control signals and altering the optical pathways through the switch based on said control signals.

14. An optical switch as set forth in claim 13, having two inputs which may be called $A_i$ and $B_i$ and two outputs which may be called $A_o$ and $B_o$, wherein the default setting sends input from $A_i$ to $A_o$ and $B_i$ to $B_o$.

15. An array of optical switches as set forth in claim 14, substantially all of which are active, having but a single detector which sends the same control signals to all active switches in said array simultaneously based on said information.

16. An array having a single detector as set forth in claim 15, wherein only one switch input is used to determine the setting of all the active switches in the array.

17. An optical switch as set forth in claim 13, having two inputs which may be called $A_i$ and $B_i$, and two outputs which may be called $A_o$ and $B_o$, wherein the default setting sends input from $A_i$ to $B_o$ and from $B_i$ to $A_o$.

18. An array of optical switches as set forth in claim 17, substantially all of which are active, having but a single detector which sends the same control signals to all active switches in said array simultaneously based on said information.

19. An array having a single detector as set forth in claim 17, wherein only one switch input is used to determine the setting of all the active switches in the array.

20. A switching device as set forth in claim 11 wherein all the switches in the path, from source to destination, allow a confirmation signal to be sent back to the source to confirm the connection to the destination before the data communication begins.

21. A switching device as set forth in claim 11 wherein the datastream is so arranged in a packet that the header and delay are sent together and the data follows.

* * * * *